US012767887B2

(12) United States Patent
Edwards et al.

(10) Patent No.: US 12,767,887 B2
(45) Date of Patent: Oct. 20, 2026

(54) EROSION REMEDIATION PRODUCT

(71) Applicant: PROFILE PRODUCTS LLC, Buffalo Grove, IL (US)

(72) Inventors: Ronald Charles Edwards, Worley, ID (US); Nathan Joseph Hoegger, Spokane Valley, WA (US); Michael Dan Robeson, Windsor, CO (US); Matthew Michael Welch, Menasha, WI (US)

(73) Assignee: PROFILE PRODUCTS LLC, Buffalo Grove, IL (US)

( * ) Notice: Subject to any disclaimer, the term of this patent is extended or adjusted under 35 U.S.C. 154(b) by 461 days.

(21) Appl. No.: 18/461,075

(22) Filed: Sep. 5, 2023

(65) Prior Publication Data

US 2024/0076551 A1 Mar. 7, 2024

Related U.S. Application Data

(60) Provisional application No. 63/410,385, filed on Sep. 27, 2022, provisional application No. 63/403,803, filed on Sep. 5, 2022.

(51) Int. Cl.
*C09K 17/52* (2006.01)

(52) U.S. Cl.
CPC .................................... *C09K 17/52* (2013.01)

(58) Field of Classification Search
CPC ........ C09K 17/52; C09K 17/00; C09K 17/46; C09K 17/48; C09K 2105/00; C09K 2101/00; A01G 13/35; A01G 24/22; A01G 24/20
See application file for complete search history.

(56) References Cited

U.S. PATENT DOCUMENTS

| | | | | |
|---|---|---|---|---|
| 2,757,150 A | | 7/1956 | Heritage | |
| 3,889,884 A | * | 6/1975 | Morse | A01K 1/0155 241/19 |
| 5,891,937 A | * | 4/1999 | Berg | E02B 15/06 428/221 |
| 7,891,933 B2 | | 2/2011 | McKee | |
| 8,490,326 B1 | | 7/2013 | Lee et al. | |
| 9,523,535 B1 | | 12/2016 | Christison et al. | |
| 10,266,457 B2 | | 4/2019 | Spittle et al. | |
| 10,519,073 B2 | | 12/2019 | Spittle et al. | |
| 10,519,373 B2 | | 12/2019 | Spittle et al. | |
| 10,907,098 B2 | | 2/2021 | Spittle et al. | |
| 12,098,317 B2 | * | 9/2024 | Edwards | A01G 13/35 |
| 2007/0283620 A1 | * | 12/2007 | Karpik | A01G 13/35 47/9 |
| 2015/0090933 A1 | | 4/2015 | Morris | |
| 2017/0152441 A1 | | 6/2017 | Spittle et al. | |
| 2022/0380671 A1 | * | 12/2022 | Edwards | A01G 13/35 |

FOREIGN PATENT DOCUMENTS

| | | | | |
|---|---|---|---|---|
| CN | 107337561 A | * | 11/2017 | C05G 3/80 |
| CN | 107502357 A | * | 12/2017 | C09K 17/04 |
| CN | 108033858 A | * | 5/2018 | C05G 3/80 |
| CN | 109997649 A | * | 7/2019 | C05G 3/60 |
| CN | 116515494 A | * | 8/2023 | C09K 17/40 |

OTHER PUBLICATIONS

Zhao translation, CN 109997649 , retrieved from EPO: Jan. 8, 2026, https://translationportal.epo.org/emtp/translate/?ACTION=description-retrieval&COUNTRY=CN&ENGINE=google&FORMAT=docdb&KIND=A&LOCALE=en_EP&NUMBER=109997649&OPS=ops.epo.org/3.2&SRCLANG=zh&TRGLANG=en (Year: 2019).*
Sui translation, CN107502357, retrieved from EPO: Jan. 8, 2026, https://translationportal.epo.org/emtp/translate/?ACTION=description-retrieval&COUNTRY=CN&ENGINE=google&FORMAT=docdb&KIND=A&LOCALE=en_EP&NUMBER=107502357&OPS=ops.epo.org/3.2&SRCLANG=zh&TRGLANG=en (Year: 2017).*
NPL_International Preliminary Report on Patentability & Written Opinion, dated Mar. 1, 2025, received in related PCT Appln. No. PCT/US2023/032005.
International Search Report received for related application No. PCT/US2023/032005, dated Jan. 31, 2024. 2 pages.

* cited by examiner

*Primary Examiner* — Kristen C Hayes
(74) *Attorney, Agent, or Firm* — BROOKS KUSHMAN P.C.

(57) ABSTRACT

A composition includes a plurality of processed leguminous straw particles having about 18-21 wt. % of particles on sieve #25 or particles measuring 0.71-1.17 mm and about 18-20 wt. % of particles on sieve #50 or particles measuring 0.3-0.7 mm, based on total weight of the leguminous straw particles, the composition being a mulch composition.

21 Claims, 7 Drawing Sheets

EROSION REMEDIATION PRODUCT

CROSS-REFERENCE TO RELATED APPLICATIONS

This application claims the benefit of U.S. provisional application Ser. No. 63/403,803 filed Sep. 5, 2022, and U.S. provisional application Ser. No. 63/410,385 filed Sep. 27, 2022, the disclosures of which are hereby incorporated in their entirety by reference herein.

TECHNICAL FIELD

The present disclosure is related to a composition suitable for erosion control, fertilization, and revegetation and methods of making and using the same.

BACKGROUND

Various products have been developed to combat erosion, a natural phenomenon resulting in loss of soil, topsoil, ability of soil to hold nutrients, regulate water flow, and combat pollutants.

SUMMARY

In one or more embodiments, a composition is disclosed. In one or more embodiments, the composition is an erosion control composition, and in other embodiments is a mulch composition. One embodiment of the erosion control composition or mulch composition may include a leguminous straw, refined pulp fibers, and optionally a secondary source of straw and/or wood/bark fiber. The leguminous straw may be alfalfa straw. The composition may also include a tackifier, biostimulant, fertilizer, water, or their combination. The leguminous straw may be a mixture including more than one species. The secondary straw may be present and may be a wheat straw. A ratio of the leguminous straw and the secondary straw may be about 50:50. The particle distribution of the leguminous straw may include about 17-20 of particles on sieve #25 or particles measuring 0.71-1.17 mm and about 18-20 of particles on sieve #50 or particles measuring 0.3-0.7 mm.

In at least one embodiment, a composition is disclosed. The composition may include a plurality of processed leguminous straw particles having about 18-21 wt. % of particles on sieve #25 or particles measuring 0.71-1.17 mm and about 18-20 wt. % of particles on sieve #50 or particles measuring 0.3-0.7 mm, based on total weight of the leguminous straw particles. The composition may be a mulch composition. The composition may further include one or more mechanical integrity additives. The leguminous straw particles may include milled alfalfa straw particles. The composition may further include at least one of a tackifier, dye, biostimulant, fertilizer, water, wood and/or bark fiber, secondary straw particles. The leguminous straw particles may include a mixture of leguminous straw species. The secondary straw particles may be present and are wheat straw particles. A vol. % ratio of the leguminous straw particles to the secondary straw particles may be about 40:60-60:40. The leguminous straw particles may include organically bound NPK. The one or more mechanical integrity additives may include at least one of refined pulp fiber, cellulose pulp fiber, sodium polyacrylate, carboxy methyl cellulose, paper particles, fluff pulp fibers, reclaimed SAM fluff pulp mix fibers, cellulose pulp fibers, recycled paper, recycled newsprint, cellulose fibers.

In another embodiment, a composition is disclosed. The composition may include a blend of natural straw particles including about 5-95 wt. % alfalfa straw particles and about 5-95 wt. % secondary straw particles, the alfalfa straw particles forming about 5-95 wt. % of the composition. The composition may further include mechanical integrity additives. The composition may be a slow-release fertilizer composition. The one or more mechanical integrity additives may include at least one of refined pulp fiber, cellulose pulp fiber, sodium polyacrylate, carboxy methyl cellulose, paper particles, fluff pulp fibers, reclaimed SAM fluff pulp mix fibers, cellulose pulp fibers, recycled paper, recycled newsprint, cellulose fibers. The secondary straw particles may include wheat straw particles. The composition may also include refined fibers of wood, refined fibers of bark, or refined fiber of wood and bark. The alfalfa straw particles may be hammermilled alfalfa straw particles. A vol. % ratio of the alfalfa straw particles to the secondary straw particles may be about 40:60-60:40. A particle distribution of the alfalfa straw particles may include about 17-20 wt. % of particles on sieve #25 or particles measuring 0.71-1.17 mm and about 18-20 wt. % of particles on sieve #50 or particles measuring 0.3-0.7 mm, based on total weight of the alfalfa straw particles. The composition may also include a cotton byproduct.

In yet another embodiment, a mulch composition is disclosed. The composition may include a plurality of milled alfalfa stalk particles having a particle distribution of about 17-20 wt. % of particles on sieve #25 and about 18-20 wt. % of particles on sieve #50, based on the wt. % of the milled alfalfa stalk particles. The composition may further include a plurality of secondary straw particles. The composition may have a pH of about 5.5-7.5. The composition may also include a tackifier, dye, biostimulant, fertilizer, water, wood and/or bark fiber, or a combination thereof. The mulch composition may be a slow-release fertilizer composition. The composition may also include a cotton byproduct. The secondary straw particles may be wheat straw particles. A vol. % ratio of the milled alfalfa stalk particles to the secondary straw particles may be about 40:60-60:40.

DETAILED DESCRIPTION

Figure 1:
FIG. 1 is a photograph of an example alfalfa field.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the disclosure. Practice within the numerical limits stated is generally preferred. Also, unless expressly stated to the contrary: percent, "parts of," and ratio values are by weight; the description of a group or class of materials as suitable or preferred for a given purpose in connection with the disclosure implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the disclosure can be obtained within a range of +/−5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . , 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. Similarly, whenever listing integers are provided herein, it should also be appreciated that the listing of integers explicitly includes ranges of any two integers within the listing.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

As used herein, the term "and/or" means that either all or only one of the elements of said group may be present. For example, "A and/or B" means "only A, or only B, or both A and B". In the case of "only A," the term also covers the possibility that B is absent, i.e. "only A, but not B".

It is also to be understood that this disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed subject matter can include the use of either of the other two terms.

The term "one or more" means "at least one" and the term "at least one" means "one or more." The terms "one or more" and "at least one" include "plurality" as a subset.

The description of a group or class of materials as suitable for a given purpose in connection with one or more embodiments implies that mixtures of any two or more of the members of the group or class are suitable. Also, the description of a group or class of materials as suitable for a given purpose in connection with one or more embodiments implies that the group or class of materials can "comprise," "consist of," and/or "consist essentially of" any member or the entirety of that group or class of materials. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The term "growing medium" (GM) refers to a substrate, specifically a soil-free substrate or a substrate with soil, or a combination of materials used to provide physical support, water retention, aeration, and/or nutrient supply for plant growth so that a plant can establish its root system within the growing medium and allow for root growth, as the roots grow in spaces between individual particles of the growing medium.

The term "mulch" or "mulch composition" as used herein means a layer of fibrous material that is applied to a soil to reduce erosion, to improve water retention, and/or to hold a seed in place on the soil surface long enough for the seed to germinate and for the root to develop within the soil below the mulch. Hydraulic mulches are mulches applied by spraying with water through a hydraulic seeder or similar device. The terms "growing medium" and "mulch composition" are used interchangeably.

The terms "particles" and "fibers" may be used interchangeably unless stated to the contrary.

Soil erosion is a natural process which has happened since the first landforms emerged on our planet. Erosion acts slowly, but tirelessly over time. Erosion includes chemical weathering caused by dissolution of rocks and minerals. Erosion also includes physical weathering caused by mechanical erosion factors. The traditional erosion forces of wind and water were joined by animals' and finally humankind's alteration of terrains such as cutting forests, herding animals, etc. For example, modern soil studies have linked significant erosion events not to the drastic climate change of the last glaciation, but to the introduction of farming. The existence of ancient erosion control measures such as terraced hillsides on virtually every inhabited continent further suggest that ancient peoples understood the importance of preserving soil. Numerous soil conservation measures have been implemented to control erosion in various sectors including farming, construction, and highway embankment design.

Recently, the effects of climate change such as extreme weather patterns, fires, mudslides, overpopulation, and insensitive industrial decisions have accelerated erosion problems around the globe. For example, dust plumes generated by wind erosion from the Sahara Desert are increasingly traveling beyond the Mediterranean Sea into Southern Europe, and even as far as the Gulf Coast of the United States. The Western part of the United States, Australia, and other arid and semi-arid areas are similarly experiencing unprecedented erosion rates. Additionally, areas with no lack of water and precipitation such as the Great Lakes region and deforested areas of Asian countries are being forced to tackle new erosion problems associated with loss of land due to landslides, river and lake bank erosion, etc.

Any soil that is not covered may be susceptible to erosion by wind and water. Farmland is particularly susceptible to erosion due to the deforestation and clearing necessary to grow specific crops. Erosion on farmland is detrimental to crops, as disturbing topsoil reduces organic matter in the soil, decreases rooting depth, and affects the amount of nutrients, water, and air available to plants. In addition to lowering crop yield, nutrient and sediment run off can pollute rivers and lakes causing flooding of surrounding areas and injury to plants and animals. Additionally, dust generated by wind erosion can reduce air quality and negatively impact human and animal health. To battle erosion, farmers utilize various methods of erosion control including crop rotation, cover crops, grassed waterways, and mulching.

Construction sites are another major contributor to soil erosion, in part because the land must be cleared for construction to begin, but also because topsoil is physically removed or altered to dig basements, grade sites, or fill sites. Additionally, retired mining sites, deforested land, grazing areas are likewise often negatively affected by soil degradation and loss due to erosion.

Various means to control, slow down, or prevent erosion have been developed such as building of block walls, earth walls, rocks. Other means include efforts to reestablish vegetation, providing root system capable of capturing the soil. Some efforts utilize netting or blankets which are woven or loose. The material may include straw, grass, and artificial fibers. Alternatively, hydraulic mulches have been developed for this purpose.

There are several categories of mulch, for example organic and inorganic. Organic mulch may be composed of previously living components such as grass, wood, compost, or manure. Inorganic mulch may be made from synthetic components such as plastics, landscape fabrics, or rocks. Polyethylene plastic is becoming a popular inorganic mulch in agriculture. While inorganic mulches do not have to be replaced as often, they do not perform as well in terms of protecting plants from temperature fluctuations or retaining moisture. They also do not deliver nutrients to the soil and can prevent nutrients from reaching the soil. Additionally, most plastic materials are made unsustainably and may not be biodegradable. Yet, there is a demand for a mulch composition with improved performance, easier mixing, loftier matrix, and improved coverage, which would be also environmentally friendly.

One of the traditionally utilized materials in the mulches has been wheat straw. Wheat straw is the stalk left over after wheat grains are harvested. The wheat straw has recently become less economical than in the past, and its availability has diminished. Wheat straw has been used as a bedding for animals, cattle forage, heating fuel, ethanol production, building material, and as a fossil fuel alternative in production of certain household items such as cups. Hence, the many uses of the wheat straw have caused price increase and shortages.

Wheat also has a relatively limited range as to where it can grow successfully, and its growth may contribute to the erosion problem itself by using heavy equipment, pesticides, and traditional liquid fertilizers needed to grow the crop. Thus, as a source, the wheat straw may not be available, and/or may not be the most environmentally conscious choice.

Additionally, wheat straw provides a very limited source of nutrients. Mulch made with wheat straw thus typically benefits from addition of nutrients. Yet the addition increases cost and manufacturing complexity.

Further still, wheat straw mulches have limited ability to absorb dye which is used to mark treated areas, and due to malleability of the straw, the wheat straw mulches may not provide as thick of a coverage as is desirable.

Hence, there is a need for an erosion remediation product utilizing alternative, environmentally friendly, and economical components. Furthermore, there is a need for a mulch or erosion remediation product which would provide satisfactory coverage and more loft or blanket thickness to optimize revegetation efforts.

In one or more embodiments, an erosion remediation product is disclosed. In one or more embodiments, a fertilizer such as a slow-release fertilizer product is disclosed. The product may be a composition, mulch composition, or growing medium composition, also referred to as a composition herein. The composition may include one or more components.

The composition includes organic or natural straw. The straw is processed by one or more processes described below, for example milling or hammermilling. The composition includes a legume-based or leguminous straw particles or straw fibers. Throughout this disclosure, the terms straw particles and straw fibers may be used interchangeably. Legumes are a family of plants in the family Fabaceae or Leguminosae. The legume-based straw may include straw particles from one or more plants including alfalfa, clover, beans, soybeans, peas, chickpeas, peanuts, lentils, lupins, carob, tamarind, or a combination thereof. The leguminous straw may be the only type of straw included in the composition.

In at least one embodiment, the leguminous straw is alfalfa straw. Alfalfa or lucerne (*Medicago sativa*) is a perennial flowering plant from the legume family. The plant resembles a clover with the main stem branching out into numerous stems bearing trifoliate leaves. The plant has clusters of yellow or purple flowers which may mature into fruits spiraled in two to three turns containing seeds. Alfalfa straw may be the only type of straw included in the composition such that the composition includes about 100 wt. % of alfalfa straw, based on the total weight of the straw in the composition.

Alfalfa is drought, heat, and cold tolerant, and able to grow in many places around the world. Just like many members of the legumes family, alfalfa plants house symbiotic soil bacteria in their root nodules which can “fix” nitrogen from the air into the soil, making it accessible to other plants. Alfalfa has thus been grown as a cover crop or as part of crop rotation. Alfalfa, harvested, is widely grown for hay, pasturage, and silage.

While alfalfa hay has many uses, the straw (or stalks) left behind the hay harvest and/or seed production harvest has become waste without use. Due to the pre-harvest treatment to increase seed harvest effectiveness, alfalfa straw is not suitable as bedding for animals or cattle forage. Additionally, alfalfa straw stalks have different properties than wheat straw stalks. For example, alfalfa stalks are less malleable and are thus not utilized for alternative uses such as fossil-fuel originating plastic alternatives.

Figure 2:
FIG. 2 PRIOR ART
FIG. 2 shows a photograph of prior art alfalfa hay.
Figure 3:
FIG. 3 is a photograph of alfalfa straw.
Figure 4:
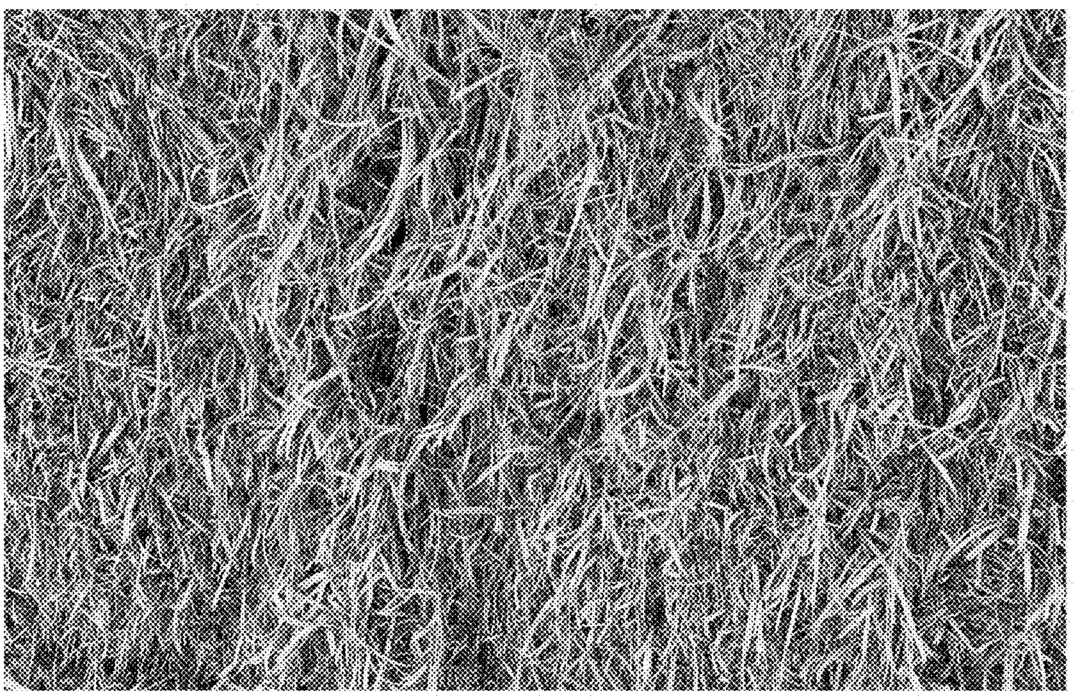
FIG. 4 is a photograph of alfalfa straw in a bale.

Hay refers to the crop that is grown and harvested. Hay typically includes a combination of different plant parts including stems, leaves, flowers, and seed. Hay is usually cut and baled. Straw, in contrast, is a byproduct of the crop, plant, or hay production. Straw includes the stalks which remain on the field after the hay is harvested. Straw, unlike hay, is thus limited to the lower portions of the plant stalks and does not generally include leaves, flowers, or seeds. The straw may thus consist of or consist essentially of stalks only. Hence, hay and straw have very different purposes, looks, and properties. FIG. 1 shows an example field of alfalfa plants. FIG. 2 shows an example of alfalfa hay including a mixture of stems, leaves, flower, and seeds. FIG. 3 shows an example of alfalfa stalks of straw. FIG. 4 shows a non-limiting example of an alfalfa straw in a bale.

It was surprisingly discovered that processing the alfalfa straw by the process described below and including the alfalfa straw in the composition disclosed herein, renders the alfalfa straw well-suited for erosion prevention and remediation composition for multiple reasons. Without limiting this disclosure to a single theory, it is believed that the alfalfa straw provides superior fiber entanglement, that the straw stalk fiber has such rigidity that enables the fibers to intertwine and form an entangled entity. This is both in dry and wet form. The entanglement is suitable for hydrospraying applications, provides better air movement within the applied layer, and enables the alfalfa straw fibers to have a good compactness and interconnectivity. As a result, the hydrosprayed alfalfa-based composition forms a more uniform blanket with thicker, more even accumulation of the composition than other compositions per the same composition weight and application site area (lbs/acre).

Additionally, the alfalfa-based composition provides more loft or forms a more lofty matrix after application. This is in contrast to other compositions which tend to form a less thick blanket. Loft relates to a thickness and surface coverage at a consistent application rate over an area. Loft relates to a build-up thickness of a hydraulically applied mulch product over an area. The same amount of alfalfa-based product applied over the same area results in a coverage having a greater thickness and consistency in comparison to other products, for example a mulch including 100 wt. % wheat straw. Loft refers to the applied composition thickness. The thickness in turn translates into elevated airiness enabling more air to penetrate the applied composition, reach the soil, plants, seeds, or a combination thereof while providing excellent coverage at the same time. Access to air is important for seed germination, root growth, or both. Thus, the herein-described composition provides better conditions for seed germination, seedling establishment, and plant growth. The disclosed composition based on alfalfa may provide a substantially continuous coverage without undesirable gaps.

Figure 5:
FIG. 5 is a photograph of a non-limiting example composition including alfalfa straw disclosed herein applied by hydrospraying onto an application site.
Figure 6:
FIG. 6 PRIOR ART
FIG. 6 shows a photograph of a prior art composition, free of alfalfa, applied by hydrospraying onto another application sire.

A non-limiting example of a hydrosprayed alfalfa-based composition disclosed herein is shown in FIG. 5. In contrast, a hydrosprayed wheat-based composition is shown in FIG. 6. As can be seen in FIG. 5, the alfalfa-based composition of FIG. 5 has a greater loft shown as a blanket having continuous undulating topography with a greater thickness, per volume of sprayed material, in comparison to a more flat, semi-continuous profile featuring gaps and lower thickness in the coverage of the wheat-based composition, at the same volume of sprayed material, shown in FIG. 6.

An additional advantage lies in the fact that alfalfa has an increased capacity for dye absorption when compared to other materials such as wheat straw. The resulting color difference, which is beneficial for marking purposes, is shown in FIGS. 5 and 6. As can be observed in the images, FIG. 5 shows a deep malachite green color generated by the addition of blue dye to the alfalfa-based composition. FIG. 6 shows a light mint green color generated by the same type and amount of dye per the same amount of composition as in FIG. 5.

Alfalfa, as compared to wheat straw, may form a bundle of very fine and rigid filaments. Alfalfa straw may generate wire-like fibers or fibers curled into loose hooks or coils. The fibers may entangle, but not bend or break, rather retain a firm shape. The entanglement may result in greater interaction on the fiber level, thus enabling the lofty build-up of a blanket with a greater thickness and greater air space per volume. The coiled character of the alfalfa straw is shown in FIGS. 3 and 4 and can be also seen in the alfalfa-containing composition of FIG. 9, especially in the top left corner of the image.

Figure 13:
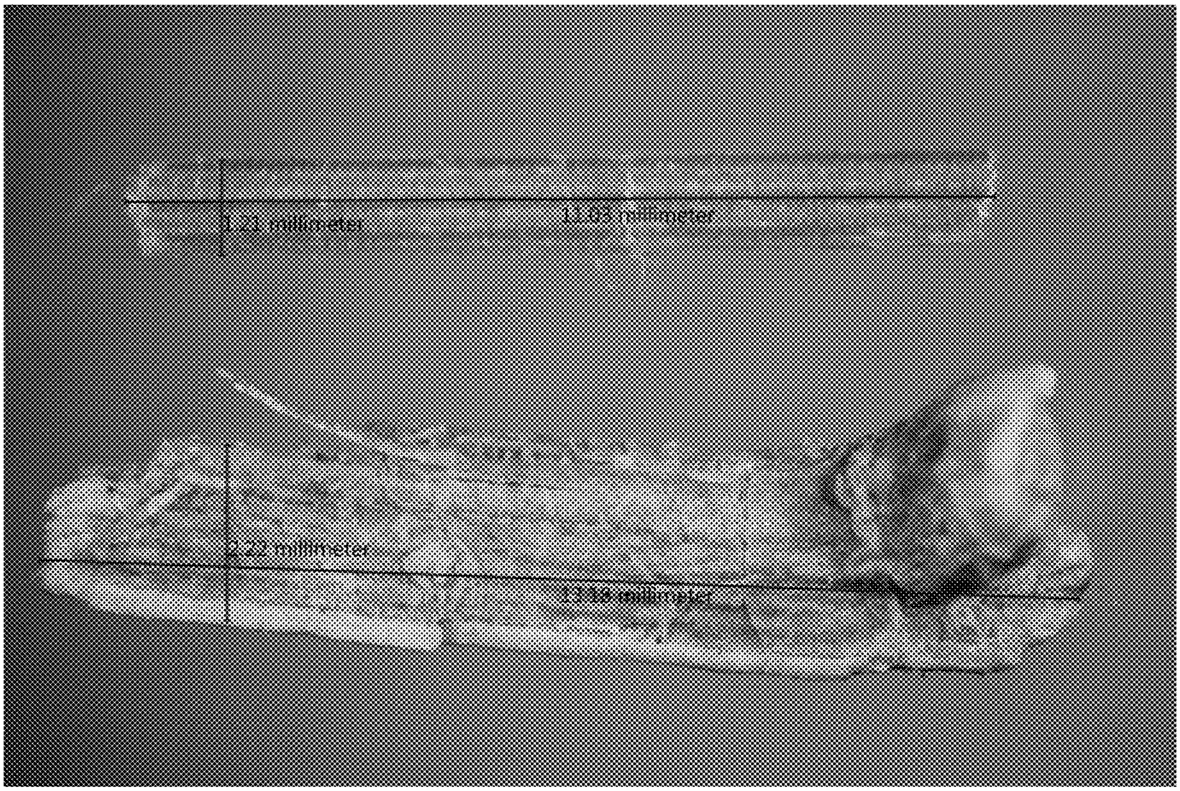
FIG. 13 is a microscopic image of a non-limiting example wheat straw particle (top) and a non-limiting example alfalfa straw particle (bottom)
Figure 14:
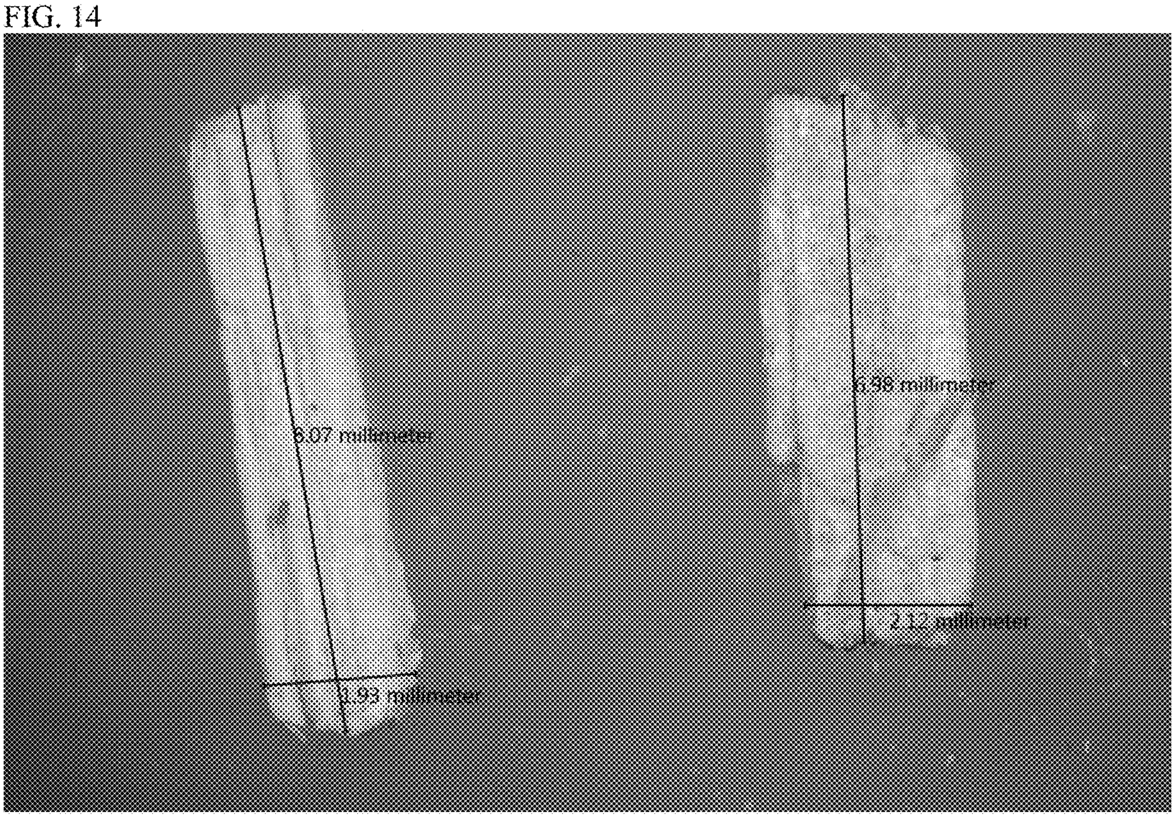
FIG. 14 is a microscopic image of non-limiting examples of alfalfa straw particles.
Figure 15:
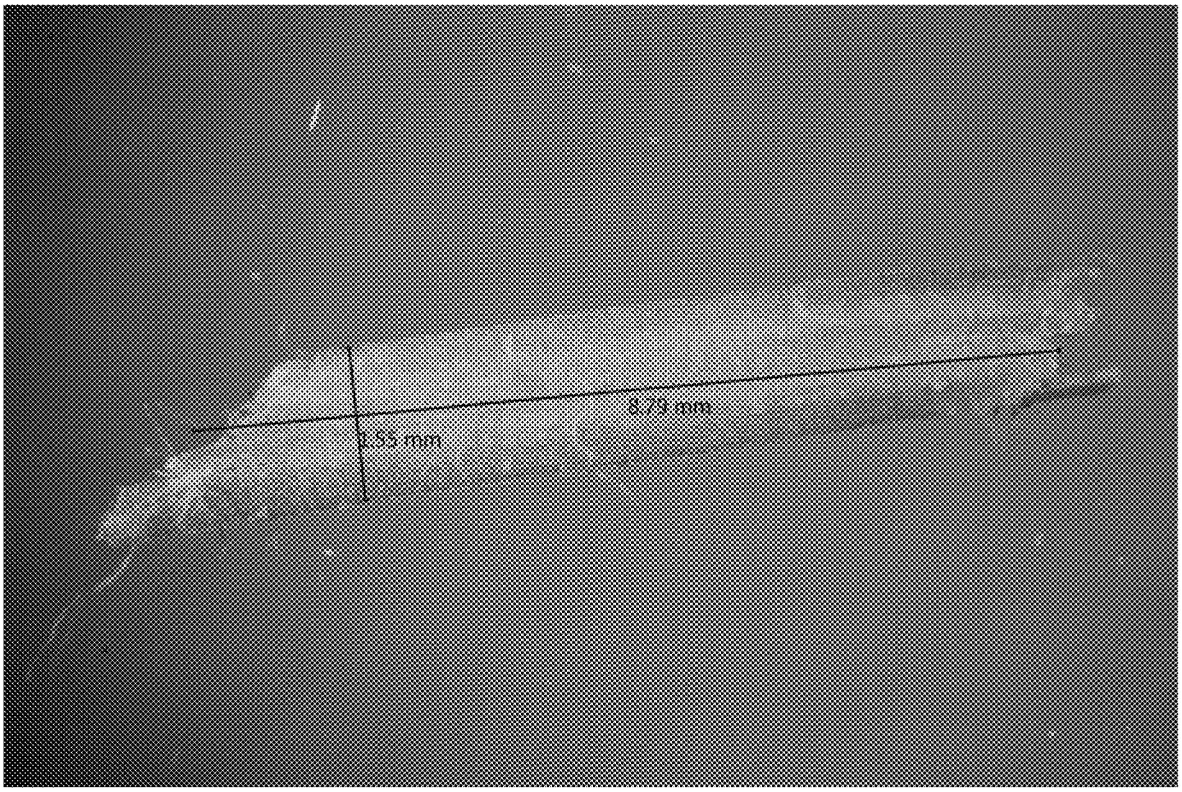
FIG. 15 is a microscopic image of a non-limiting example of wheat straw particle.

Microscopic images of the alfalfa straw in comparison to wheat straw are shown in FIGS. 13-15. FIG. 13 shows a non-limiting example of the wheat straw particle (above) processed as described herein, and a non-limiting example of the alfalfa straw particle (below) processed as described herein. As can be observed in FIG. 13, the alfalfa straw particle has a greater thickness, a curve or curl to its shape, and relatively rough texture in comparison to relatively smooth-surfaced wheat straw particle. The varied surface texture of the alfalfa straw may be also observed in another non-limiting example of FIG. 14. FIG. 15 shows another non-limiting example of the wheat straw particle.

Figure 7:
FIG. 7 shows a photograph of wheat straw.
Figure 8:
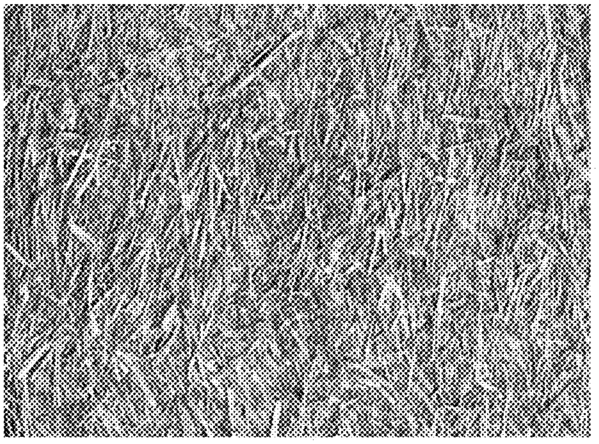
FIG. 8 is a photograph of wheat straw in a bale.

The composition may further include one or more additional types of organic or natural straw or secondary straw particles such as straw from wheat, Kentucky bluegrass, bluegrass straw, law grass, cereal grains, rice, timothy grass, hemp, kenaf, and their combination. The composition may be free of the secondary straw. Wheat straw has a different set of properties than the above-described alfalfa. For example, wheat straw has more flexible, malleable fibers with lesser liquid absorption. Wheat straw also has worse absorption of dyes and other liquid compounds than alfalfa straw. Example wheat straw samples are shown in FIGS. 7 and 8. The wheat straw visibly has straighter stalk anatomy than the alfalfa straw shown in FIGS. 3 and 4. Likewise, a composition free of alfalfa shown in FIG. 11 does not feature any coils or curls which could provide increased levels of entanglement.

The alfalfa straw and the wheat straw also differ by particle distribution. Table 1 below captures particle distribution of non-limiting Examples 1-5 and Comparative Example C1. Examples 1-3 include a single type of straw which is alfalfa straw. Comparative Example C1 is free from alfalfa straw and includes a single type of straw which is wheat. Examples 4 and 5 include a blend of alfalfa straw and wheat in a ratio of 1:1. The straw of Examples 1-5 and Comparative Example C1 was hammermilled to the size referenced herein. Data for additional Examples and Comparative Examples are shown in the Experimental Section below.

TABLE 1

Particle distribution of Examples 1-5 and Comparative Example C1

| | | Example/Comparative Example no. | | | | | |
|---|---|---|---|---|---|---|---|
| | | 1 | 2 | 3 | C1 | 4 | 5 |
| Composition breakdown | | Straw fiber 76 wt. %, Refined pulp 20 wt. %, Tackifier 4 wt. % | | | | | |
| Type of Straw Fiber | | 100 wt. % alfalfa | 100 wt. % alfalfa | 100 wt. % alfalfa | 100 wt. % wheat | 50 wt. % wheat, 50 wt. % alfalfa | 50 wt. % wheat, 50 wt. % alfalfa |
| Sieves [Mesh/μm] | Particle Range [mm] | Example Particle Distribution [%] | | | | | |
| #8/2360 | 2.36-4.74 | 15.0 | 14.3 | 19.6 | 19.0 | 18.0 | 22.0 |
| #16/1180 | 1.18-2.35 | 30 | 28.7 | 25.9 | 29.0 | 34.0 | 35.0 |
| #25/710 | 0.71-1.17 | 18.2 | 18.9 | 17.3 | 15.0 | 18.0 | 14.0 |
| #50/300 | 0.3-0.7 | 18.3 | 18.2 | 18.0 | 17.0 | 17.0 | 13.0 |
| #100/150 | 0.15-0.29 | 6.3 | 8.0 | 7.2 | 7.0 | 7.0 | 5.0 |
| Pan/<150 | <0.15 | 8.3 | 8.6 | 7.7 | 5.0 | 7.0 | 6.0 |

The above ranges were arrived at by testing the examples in a ROTAP testing procedure. A suitable ROTAP testing procedure may use a stacking of sieves in the following order from top to bottom: #8, #16, #25, #50, #100, pan. 10 g of a sample is then measured out from a primary specimen and placed on the top screen of the sieve stack, and the sieve stack is placed into the ROTAP, and secured within. The ROTAP timer is set for five minutes, and then the process is started by pressing the START/RESUME button. When the ROTAP stops, the stack of sieves is removed, the material in each sieve is collected and weighed, and the results are documented.

The alfalfa straw may have the following particle distribution: about 10-22, 14-20, 15-19, or 15.5-18.5 wt. % of particles on sieve #8 or particles equal and/or greater than 2360 μm; about 25-35, 26.5-33, or 27-32 wt. % of particles on sieve #16 or particles measuring 1.18-2.35 mm; about 17-25, 17.3-23, or 18-21 wt. % of particles on sieve #25 or particles measuring 0.71-1.17 mm; and about 18-20, 18.1-19.9, or 18.2-19.5 wt. % of particles on sieve #50 or particles measuring 0.3-0.7 mm. The composition may include about 6-9, 6.3-8.5, or 6.5-8.0 wt. % of particles on sieve #100 or particles measuring 0.15-0.29 mm, and about 7.0-10, 7.1-9.5, or 7.2-9.0 wt. % of particles on the pan or particles smaller than 150 μm.

The secondary straw, in comparison, may have the following particle distribution: about 20-40, 21-36, or 25-35 wt. % of particles on sieve #8 or particles equal and/or greater than 2360 μm; about 30-40, 33-38, or 35-37 wt. % of particles on sieve #16 or particles measuring 1.18-2.35 mm; about 13-18, 13.5-17.5, or 14-17 wt. % of particles on sieve #25 or particles measuring 0.71-1.17 mm; and about 10-20, 11-17, or 12-15 wt. % of particles on sieve #50 or particles measuring 0.3-0.7 mm. The composition may include about 2-8, 2.5-7, or 3-6 wt. % of particles on sieve #100 or particles measuring 0.15-0.29 mm, and about 1-6, 1.5-5, or 2-4 wt. % of particles on the pan or particles smaller than 150 μm.

The leguminous straw and the secondary straw may form a blend of organic straw particles. The wt. % or vol. % ratio of the alfalfa straw to the secondary straw in the blend may be about 5:95-95:5, 20:80-80:20, or 40:60-60:40. The wt. % or vol. % ratio may be about, at least about, or at most about 5:95, 10:90, 15:85, 20:80, 25:75, 30:70, 35:65, 40:60, 41:59, 42:58, 43:57, 44:56, 45:55, 46:54, 47:53, 48:52, 49:51, 50:50, 51:49, 52:48, 53:47, 54:46, 55:45, 56:44, 57:43, 58:42, 59:41, 60:40, 65:35, 70:30, 75:25, 80:20, 85:15, 90:10, or 95:5. Any interval between the numbers disclosed herein is contemplated. As such, the alfalfa straw may represent about 5-95 wt. % or vol. % of the straw particles in a straw blend. The alfalfa straw may represent about, at least about, or at most about 5, 10, 15, 20, 25, 30, 35, 40, 45, 50, 55, 60, 65, 70, 75, 80, 85, 90, or 95 wt. % or vol. % of a straw blend.

Also, in certain embodiments, there is no or negligible secondary straw such that alfalfa straw is the only, or essentially the only, straw in the composition.

The alfalfa straw may be the largest weight or volume portion of the composition. For example, the alfalfa straw weight or volume may be about 1.5, 2, 2.5, 3, 3.5, 4, 4.5, 5, 5.5, 6, 6.5, 7, 7.5, 8, 8.5, or 9 times greater than the weight or volume of any other component. The alfalfa straw may represent about 20-99, 25-95, 30-85, or 40-75 wt. or vol. %, based on the total weight or volume of the composition. The alfalfa straw may represent about, at least about, or up to about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt. or vol. %, based on the total weight or volume of the composition. In one or more embodiments, the composition may include about 100 wt. % alfalfa straw.

The alfalfa straw may represent about 5-100 wt. or vol. % of the straw fiber portion within the composition or based on the total weight or volume of straw in the composition. The alfalfa straw may represent about, at least about, or at most about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 wt. or vol. % of the straw fiber portion within the composition or based on the total weight or volume of straw in the composition.

The composition may further include mechanical integrity additive(s) including one or more of refined pulp fiber, cellulose pulp fiber, sodium polyacrylate, absorbent polymers such as carboxy methyl cellulose, paper particles, fluff pulp fibers, reclaimed SAM fluff pulp mix fibers, cellulose pulp fibers, recycled paper, recycled newsprint, and/or cellulose fibers. Mechanical integrity additives increase mechanical structure and integrity of the product, bind the fibers and individual components to one another within the product, or both. Besides the named-above mechanical integrity additive(s), binders, absorbents, flocculants, or a combination thereof may also belong to this category.

The composition may include about 5-50, 7-35, or 10-25 wt. % or vol. % of mechanical integrity additives, based on the total weight or volume of the composition. The composition may include about, a least about, or at most about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt. or vol. % of the mechanical integrity additives, based on the total weight or volume of the composition. The composition may be substantially free of the mechanical integrity additives.

The mechanical integrity additives may have the following particle distribution: about 78-99 wt. % of particles on sieve #8 or particles equal and/or greater than 2360 μm, with less than 5 wt. % of particles on sieves #16, #25, #50, #100 and less than 2 wt. % of particles on the pan.

In at least one embodiment, the composition may further include fiber from wood, bark, or their combination. The wood/bark fiber may be processed by one or more processes including refiner, hammermilling, milling, the like, or a combination thereof. The wood/bark fiber may include fibrous wood/bark components referring to wood chips, wood fiber, bark, needles, or their combination. The wood/bark fiber may be derived from coniferous and/or deciduous trees. Any type of wood/bark fiber may be used, for example the softwood varieties such as yellow poplar, cedar such as Western red cedar, fir such as Douglas fir, California redwood, spruce, and pine such as Ponderosa, Sugar, White, and Yellow varieties. For example, wood/bark fiber may refer to fibrous pine tree wood components including just fibrous pine tree wood or fibrous pine tree wood as well as fibrous tree bark, needles, chips, or a combination thereof.

The wood/bark fiber may be bark free or substantially bark free. The wood/bark fiber may include about 1-99 wt. or vol. % bark-free components, based on the total weight or volume of the wood/bark fiber. The wood/bark fiber may include about 1, 5, 10, 15, 20, 25, 30, 35, 40, 45, 50, 55, 60, 65, 70, 75, 80, 85, 90, 95, 99, or 100 wt. or vol. % bark-free components, based on the total weight or volume of the wood/bark fiber.

The wood/bark fiber may include about 1-50, 5-45, or 10-40 wt. or vol. % bark, based on the total weight or volume of the wood/bark fiber. The wood/bark fiber may include about 1, 2, 5, 10, 15, 20, 25, 30, 35, 40, 45, or 50 wt. or vol. % bark, based on the total weight or volume of the wood/bark fiber. The particle distribution of the wood/bark fiber is described below and is process dependent.

In one or more embodiments, the alfalfa straw, the secondary straw, the mechanical integrity additive(s), and/or the wood/bark fiber, may be included in relatively even quantities. Diverse ratios are also contemplated. In at least some embodiments, the secondary straw and/or the wood/bark fiber are absent such as that the composition is free from the secondary straw and/or the wood/bark fiber. Example ratios of the alfalfa straw:secondary straw:mechanical integrity additive(s):wood/bark fiber may be about 1:1:1:1, 1:1:0:0, 2:1:1:1, 2:1:0.5:0.5, 3:0.5:1:0.5, 3:1:0:0, 4:2:1:1, 5:3:1:1, 8:3:2:1, 5:0:1:0, 4:0:1:0, 3:0:1:0, 2:0:1:0, 1:0:1:0, 1:1:0:1, or the like.

The composition may be all-natural, organic, artificial materials free, sustainably produced, biodegradable, non-toxic, or a combination thereof.

The composition, or input materials of the composition, may include a dye which is not phytotoxic or otherwise does not harm the environment, plants, insects, beneficial microbes, etc. The dye may be permanent or non-permanent. The dye may include natural and/or synthetic compounds. The dye may include compounds derived from plants, fungi, lichens, invertebrates, insects, minerals, the like, or a combination thereof. Any part of the plant may be utilized to provide the dye such as roots, petals, leaves, stems, shoots, stalks, hulls, husks, ripe and/or unripe fruit, or seed. Exemplary sources of plant dyestuffs include tree varieties named above; vegetables such as carrots, beetroot, red cabbage, artichoke, spinach, celery; fruit such as blueberries, pomegranate, strawberries, avocado, cherries, raspberries, mulberries, elderberries, blackberries, grapes, peach; turmeric, fennel, basil, paprika, saffron, tea plants, coffee plants, barberry, bloodroot, lilac, coneflower, dandelion, goldenrod, hollyhock, ivy, St John's Wort, yellow dock, rose, lavender, cornflower, hyacinth, Queen Anne's Lace, hibiscus, daylily, safflower, camellia, snapdragon, nettle, milkweed, peony, Black-eyed Susan, hydrangea, chamomile, alfalfa, crocus, marigold, or the like. Exemplary mineral-based dyestuffs include iron oxide and carbon black. A non-limiting example type of non-permanent dye may include green pigments. For example, the dye may be included in the wood/bark components. Alternatively, a natural and/or synthetic dye may be used to generate the green coloring, desired by the erosion market.

The composition may further include one or more additional materials. Examples of such additional materials may include fertilizer(s), macronutrient(s), micronutrient(s), mineral(s), binder(s), natural gum(s), surfactant(s), defoamer(s), flocculant(s), interlocking manmade fiber(s), biodegradable interlocking fiber(s), biostimulant(s), compost, manure, sawdust, ceramic particles, cotton, and the like, and combinations thereof. The additional components may include seed. In general, these additional components, in total, may be present in an amount of less than about 20, 15, or 10 wt. or vol. % of the total weight or volume of the composition. The additional components in total may be present in an amount of about 1-20, 2-18, or 5-15 wt. or vol. % of the total weight or volume of the composition. The additional components in total may be present in an amount of about, at least about, or at most about 1, 2, 3, 4, 5, 6, 7, 8, 9, 10, 11, 12, 13, 14, 15, 16, 17, 18, 19, or 20 wt. or vol. % of the total weight or volume of the composition. The composition may be free of at least one of fertilizer(s), macronutrient(s), micronutrient(s), mineral(s), mechanical integrity additive(s), binder(s), natural gum(s), surfactant(s), defoamer(s), flocculant(s), interlocking manmade fiber(s), biodegradable interlocking fiber(s), biostimulant(s), paper, compost, manure, sawdust, ceramic particles, cotton, seed, and the like.

Additionally, soil may be present in an amount of about 1-20, 3-18, or 4-15 wt. or vol. %, based on the total weight or volume of the composition. Soil may be present in an amount of less than about 20, 15, or 10 wt. or vol. %, based on the total weight or volume of the composition. Soil may be absent from the composition.

The seed may include one species or a mix of species such as native or non-native grasses, wildflowers, forbs, and/or other desirable species suitable for a specific application.

Fertilizers such as nitrogen fertilizers, phosphate fertilizers, potassium fertilizers, compound fertilizers, and the like may be used in a form of granules, powder, prills, or the like. For example, melamine/formaldehyde, urea/formaldehyde, urea/melamine/formaldehyde and like condensates may serve as a slow-release nitrogenous fertilizer. Fertilizers may include slow release and/or control release fertilizers having polyolefin, polyurethane, or biodegradable coating. Fertilizers having lesser nutritional value, but providing other advantages such as improving aeration, water absorption, or being environmental-friendly may be used. The source of such fertilizers may be, for example, animal waste, plant waste, manure, compost, or a combination thereof.

Nutrients may include, for example, macronutrient, micronutrients, and minerals. Examples of macronutrients include calcium, chloride, magnesium, phosphorus, potassium, and sodium. Examples of micronutrients are also well-known and include, for example, boron, cobalt, chromium, copper, fluoride, iodine, iron, magnesium, manganese, molybdenum, selenium, zinc, vitamins, organic acids, and phytochemicals. Other macro- and micro-nutrients are contemplated.

The herein-disclosed composition may already include organically-bound nutrients due to the presence of alfalfa, which naturally contains a higher amount of iron, copper, magnesium, and/or other minerals than at least some types of the secondary straw sources such as wheat straw. Hence, the composition may be more economical as the nutrient addition may be omitted. The composition may be free of added/synthetic nutrients, macronutrients, micronutrients, or minerals. The primary source of nutrients may be the alfalfa straw.

The composition may thus present, be, or include a natural, slow-release fertilizer. Slow-release fertilizers are a group of fertilizers with a slower release rate of nutrients than conventional water-soluble synthetic fertilizers. The rate, pattern, and duration of nutrient release from the slow-release fertilizers are not controlled because they depend on microbial organisms whose effectiveness is tied to soil temperature, moisture conditions, etc.

Table 2 provides comparison of nutrients present in 100 wt. % wheat straw, 50/50 wheat/alfalfa straw blend, and 100 wt. % alfalfa straw. As can be observed from Table 2, alfalfa straw is a remarkable source of nitrogen (N), phosphorus (P), and potassium (K), among other nutrients. Alfalfa straw is thus a source of naturally derived NPK and organically bound nutrients.

Unlike added synthetic fertilizers which have NPK bound in the form of water soluble salts, the naturally derived NPK in the alfalfa straw are present in the tissues of the alfalfa plant. The tissues also include carbon as part of its chemical makeup which is a source of nutrition for soil microbes capable of breaking down the tissues and thus releasing the nutrients. The nutrients had been accumulated within the tissues of the alfalfa plant through its roots via cation exchange and from the air through the leaves. Typically, a plant includes a diverse system of nutrient transports in plant cells, mechanisms mediating the nutrient uptake and release, as well as various storage mechanisms. The plant-stored nutrients such as NPK are thus not present in the form of inorganic salts, but rather bound to plant tissues, non-limiting examples of which may include vacuoles. On a chemical level, the binding may be via amino acids and/or vegetative storage protein among other options the plant has.

Thus, the nutrients in the alfalfa straw are released gradually without a sudden release which may be typical for synthetic fertilizers. As the synthetic fertilizer salts solubilize in water, a greater than desirable amounts may be released at once and result in a leachate or chemical burn of the site. In contrast, the nutrients from alfalfa straw may be released at a rate a growing plant can utilize. The nutrients may be released at a slower rate than synthetic fertilizers, but over an extended amount of time as microbes present in the soil may break down the alfalfa straw material, releasing the nutrients gradually. The release thus does not overstimulate growth, but rather promotes stronger root growth, which may contribute to healthier root establishment, stronger plants, plants with greater resistance towards disease and insects, etc.

Additionally, as can be seen in Table 2, the alfalfa straw has a substantial amount of nitrogen stored in various forms. While nitrate is the most available form to plants, other forms of nitrogen such as ammonium are converted to nitrate. The conversion further contributes to the desirable, naturally slow release of the nutrients from the alfalfa straw. The alfalfa-based composition may thus serve as a natural slow-release fertilizer composition.

TABLE 2

Chemical makeup and properties of wheat, wheat/alfalfa, and alfalfa straw examples

| Example content | 100 wt. % wheat straw | 50 wt. % alfalfa straw 50 wt. % wheat straw | 100 wt. % alfalfa straw |
|---|---|---|---|
| Soluble salts (EC) | 2.04 | 2.73 | 4.18 |
| pH | 6.45 | 5.78 | 7.1 |
| Total N | 17.63 | 29.65 | 60.39 |
| $NO_3$—N | 11.46 | 12.73 | 31.98 |
| $NH_4$—N | 0.13 | 3.63 | 18.06 |
| Urea-N | 6.04 | 13.29 | 10.35 |
| P | 8.95 | 20.16 | 43.88 |
| $P_2O_5$ | 20.51 | 46.19 | 100.54 |
| K | 470.14 | 681.66 | 1218.6 |
| $K_2O$ | 566.38 | 821.19 | 1468 |
| Ca | 14.61 | 62.93 | 97.41 |
| Mg | 8.85 | 34.15 | 47.41 |
| S | 35.34 | 29.46 | 53.5 |
| $SO_4$ | 106.02 | 88.36 | 160.51 |
| Fe | 0.57 | 0.63 | 0.88 |
| Mn | 0.68 | 0.59 | 0.45 |
| B | 0.66 | 0.96 | 1.43 |
| Cu | 0.18 | 0.23 | 0.18 |
| Zn | 0.68 | 0.13 | 0.14 |
| Mo | 1.11 | 0.28 | 0.46 |
| Na | 159.2 | 200.6 | 177.2 |
| Cl | 60.02 | 30.25 | 114.54 |
| Al | 2.48 | 3.11 | 1.82 |

The binders, chemical binders, or tackifiers, may be natural or synthetic. Binders may be especially useful in the hydraulically applied composition. The natural binders or tackifiers may include a variety of starches such as corn starch, modified celluloses such as hydroxyalkyl celluloses and carboxyalkyl cellulose, or naturally occurring gums such as guar gum, gum tragacanth, and the like. Natural and synthetic waxes may also be used.

The synthetic binders may include a variety of polymers such as addition polymers produced by emulsion polymerization and used in the form of aqueous dispersions or as spray dried powders. Examples include styrene-butadiene polymers, styrene-acrylate polymers, polyvinylacetate polymers, polyvinylacetate-ethylene (EVA) polymers, polyvinylalcohol polymers, polyacrylate polymers, polyacrylic acid polymers, polyacrylamide polymers and their anionic- and cationic-modified copolymer analogs, i.e., polyacrylamide-acrylic acid copolymers, and the like. Powdered polyethylene and polypropylene may also be used. When used, synthetic binders are preferably used in aqueous form, for example as solutions, emulsions, or dispersions. Binders may be especially useful in the hydraulically applied composition.

Thermoset binders may also be used, including a wide variety of resole and novolac-type resins which are phenol/formaldehyde condensates, melamine/formaldehyde condensates, urea/formaldehyde condensates, and the like. Most of these are supplied in the form of aqueous solutions, emulsions, or dispersions, and are generally commercially available.

The composition may include about 0.5-20, 4-18, or 5-15 wt. % or vol. % of binders/tackifiers, based on the total weight or volume of the composition. The composition may include about, a least about, or at most about 0.5, 1, 1.5, 2, 2.5, 3, 3.5, 4, 4.5, 5, 6, 7, 8, 9, 10, 11, 12, 13, 14, 15, 16, 17, 18, 19, or 20 wt. or vol. %, based on the total weight or volume of the composition. The composition may be free of added binders, tackifiers, or both.

Surfactants may include any compound that lower the surface tension between components of the composition. Surfactants may be surface-active agents. Surfactants may act as defoamer(s). The defoamer(s) may prevent foam from forming or control existing foam level by stopping bubbles from stabilizing. Surfactant(s) may act as solubilizers, configured to help make otherwise insoluble liquids soluble in water. Non-limiting example defoamers may include silicone-based emulsions. Non-limiting example solubilizers may include dialdehydes. The composition may be free of surfactants.

Flocculants may include any compound that makes fine and subfine solids or colloids suspended in the solution form large loose flocs. Non-limiting example flocculants may include anionic polyelectrolytes. The composition may be free of flocculants.

Biostimulants may include any substance or microorganism that, when applied to seeds or plants, stimulates natural processes to enhance or benefit nutrient update, nutrient use efficiency, and/or crop quality and yield. Biostimulants may include many different types. Non-limiting example biostimulants include enzymes, proteins, amino acids, protein hydrolases and/or other N-containing compounds, micronutrients such as Al, Co, Na, Se and Si, phenols, salicylic acid, monosilicic acid, humic acid, fulvic acid, seaweed extract, botanicals, biopolymers such as chitosan, inorganic compounds such as amorphous silica ($SiO_2 \cdot nH_2O$), microbial biostimulants including mycorrhizal and non-mycorrhizal fungi, bacterial endosymbionts (like *Rhizobium*) and Plant Growth-Promoting Rhizobacteria, fungi, whey, fish oils, etc. Just like nutrients discussed above, biostimulants may be provided as part of the alfalfa straw, secondary straw, or both, organically bound within the straw instead of a separately added source.

Ceramic particles may include calcined particles. The calcined particles may be based on clay. The calcined clay particles may include one or more types of clay. The clay may include, for example, smectite clay(s) including the following minerals: montmorillonite, beidellite, nantronite, saponice, hectorite. The clay may be gray, red, or both. The clay particles may be processed in the following manner for the purposes of the disclosed application. The clay may be calcined at a temperature of about 1000 to 1400, 1100 to 1350, or 1200 to 1300° F. or 537-760, 593-732, or 648-704° C. The clay may be subsequently sized or micronized, for example, by grinding. The clay may be provided in various sizes. Additional particles may include perlite, vermiculite, sand particles, zeolite, hydrated aluminosilicate minerals that contain alkali and alkaline-earth metals, or a combination thereof. The mineral particle(s) may be treated or untreated. The composition may be free of ceramic particles.

The cotton may include cotton byproduct(s) or any secondary materials derived from cotton production or any material that remains after the cotton fiber, cottonseed oil, or other primary cotton products are harvested. Alternatively or in addition, the cotton may include primary cotton products such as cotton fiber, oil, or both at least in a trace amount. The cotton may include one or more portions of the cotton shrub including stems, squares, flowers, bolls, leaves, lint, seed, or bur in their raw and/or processed form including fiberized and/or compressed stems, squares, flowers, bolls, leaves, lint, seed, or bur. In a non-limiting example, the cotton byproduct(s) may include mote cotton, linters cotton, or both, optionally with remnants of cotton fiber, cottonseed oil, etc.

The composition may further include added water, especially for hydroseeding purposes. The composition may be an aqueous composition. The composition may be free of added water.

The individual components of the composition may be prepared by one or more processes. One or more input components of the composition may be sterile.

In a non-limiting example, the fibrous wood components may be prepared by the following process. An initial composition may be formed by combining tree bark and/or wood components together to form the initial composition. Subsequently, the initial composition may be heated to an elevated temperature to kill microbes in a pressurized vessel. Typically, the heating step may be conducted at a temperature in the range of about 250° F. (121° C.) or lower to about 500° F. (260° C.) or higher, about 300° F. (149° C.) to about 400° F. (204° C.), about 320° F. (160° C.) to 380° F. (about 193° C.). The heating step may be conducted for a time sufficient to kill microbes. The heating step may be conducted for about 1 to about 5 minutes or longer under a steam pressure of about 35 lbs/in$^2$ (2.4 kg/cm$^2$) to about 120 lbs/in$^2$ (8.4 kg/cm$^2$) or about 50 lbs/in$^2$ (3.5 kg/cm$^2$) to about 100 lbs/in$^2$ (7.0 kg/cm$^2$). For example, the heating step may be conducted at a temperature of about 300° F. (149° C.) for about 3 minutes at about 80 lbs/in$^2$ (5.6 kg/cm$^2$). For example, the heating step may be conducted at a temperature of about 300° F. (149° C.) for about 3 minutes. The heating step results in a preferably substantially sterile composition such that the composition is free from bacteria or other living organisms. The steam flow rate during the heating step may be from about 4000 lbs/hour (1814 kg/hour) to about 15,000 lb/hour (6803 kg/hour).

An example of a pressurized vessel and related process for step b) is disclosed in U.S. Pat. No. 2,757,150, which is incorporated by reference, in which wood chips are fed to a pressurized steam vessel which softens the chips. Any type of wood chip may be used in this process, but wood chips of the softwood varieties such as yellow poplar, and particularly pine, are preferred.

Subsequently, the initial composition may be processed through a refiner to form the wood/bark fiber. The refiner may use a plurality of disks to obtain the wood/bark fiber. The refiner may use two or more disks, one of which is rotating, to separate wood fibers from each other as set forth in U.S. Pat. No. 2,757,150, the entire disclosure of which is hereby incorporated by reference. The refiner is usually operated at a lower temperature than the temperature used in the previous step. The refiner may be operated at a temperature in the range of about 70° F. (21° C.) to about 400° F. (204° C.), about 150° F. (66° C.) to about 350° F. (176° C.), about 200° F. (93° C.) to about 300° F. (148° C.). The refiner may be operated under steam. The refiner may be operated at atmospheric pressure or elevated pressures such as pressures of about 50 lb/in$^2$ (3.5 kg/cm$^2$) or lower to about 100 lb/in$^2$ (7.0 kg/cm$^2$). Additional components may be added during step such as a dye or a surfactant.

Furthermore, the wood/bark fiber may be dried at temperatures of about 400° F. (204° C.) to about 600° F. (316° C.) for the time sufficient to reduce the moisture content to a value less than about 45 weight %, less than about 25 weight %, or less than about 15 weight %, based on the total weight of the wood/bark fiber. The drying step may be about 1-10, 2-8, or 3-5 seconds long. Exemplary equipment for drying of the wood/bark fiber may be a flash tube dryer capable of drying large volumes of the wood/bark fiber in a relatively short length of time due to the homogeneous suspension of the particles inside the flash tube dryer. While suspended in the heated gas stream, maximum surface exposure is achieved, giving the wood/bark fiber uniform moisture. The moisture content of the wood/bark fiber may be from about 10-50, 20-40, or 25-35 weight %, based on the total weight of the wood/bark fiber. The wood/bark fiber may be further refined and additional components may be added.

The particle distribution of the fibrous wood components prepared by the process described immediately above may be as follows: about 4-25, 6-22, or 8-20 wt. % of particles on sieve #8 or particles equal and/or greater than 2360 μm, about 9-30, 12-28, or 15-20 wt. % of particles on sieve #16 or particles measuring 1.18-2.35 mm, about 15-35, 20-30, or 22-28 wt. % of particles on sieve #25 or particles measuring 0.71-1.17 mm, about 15-30, 20-38, or 22-25 wt. % of particles on sieve #50 or particles measuring 0.3-0.7 mm. The composition may include about 6-15, 7-12, or 8-10 wt. % of particles on sieve #100 or particles measuring 0.15-0.29 mm, and about 2-20, 5-18, or 10-15 wt. % of particles on the pan or particles smaller than 150 μm.

Alternatively, in another non-limiting example, the fibrous wood components may be prepared by a different process. The process may include at least one stage of heating, moisturizing, drying, pressurizing, refining, fiberizing, opening, compressing, sizing, dyeing, surfactant inclusion, or a combination thereof. The wood/bark components may be hammermilled, non-hammermilled, or a combination thereof.

The particle distribution of the wood/bark components prepared by the alternative process described immediately above may be as follows: about 40-50, 41-48, or 44-46 wt. % of particles on sieve #8 or particles equal and/or greater than 2360 μm, about 10-30, 12-25, or 15-20 wt. % of particles on sieve #16 or particles measuring 1.18-2.35 mm, about 5-25, 8-22, or 10-20 wt. % of particles on sieve #25 or particles measuring 0.71-1.17 mm, about 17-22, 18-21, or 19-20 wt. % of particles on sieve #50 or particles measuring 0.3-0.7 mm. The composition may include about 17-22, 18-21, or 19-20 wt. % of particles on sieve #100 or particles measuring 0.15-0.29 mm, and about 5-7, 5.2-6.8, 5.5-6 wt. % of particles on the pan or particles smaller than 150 μm.

The alfalfa straw, secondary types of straw, or both may be independently prepared by hammermilling to sizes of about 6-13, 8-12, or 10-11 mm, and preferably abraded to partially release fibers for entanglement. The hammermilled sizes may include about 6, 6.5, 7, 7.5, 8, 8.5, 9, 9.5, 10, 10.5, 11, 11.5, 12, 12.5, or 13 mm in length. Alternatively, the alfalfa straw, the wheat or another straw may be included as raw materials as received and hammermilled during the common processing described below. The input materials may be thus in raw state or pre-processed state such as hammermilled.

A method of preparing the erosion remediation composition described herein is disclosed. The method may include pre-processing one or more initial components, as was described above, and then combining them into a blend. The method may include combining the components first and then milling them to a desired size to form a blend. Combining may mean mixing, placing together, placing on top of each other in a container, the like, or a combination thereof. The milling may include hammermilling. The method may include blending, mixing, further combining the milled components of the blend. The method may also include adding one or more additional components described herein to the milled components of the blend and further mixing the blend to form the herein-disclosed composition.

In at least one embodiment, the method may include grinding, instead of milling, the one or more components such as the alfalfa straw, wheat straw, mechanical integrity additive(s), and wood/bark fiber, or their combination. The grinding may be done as part of the pre-processing. The grinding may be provided after the components are combined.

The method may include passing the mixture/blend via one or more magnetic devices to remove any metallic debris, a cyclonic separator to remove dust, and/or a steam chamber to fiberize the mixture/blend. The method may include adding a dye, tackifier, surfactant, defoamer, flocculant, and/or additional materials to the mixture/blend. The method may include forming the final composition into bales.

Additionally, the method of applying the erosion remediation composition is disclosed herein. The method may include providing the final composition into a tank of a hydro-spraying machine, adding a predetermined amount of one or more of water, surfactant, defoamer, flocculant, tackifier, fertilizer, macronutrients, micronutrients, mechanical integrity additives, seed, additional fibers, and/or other additives, and mixing the components for a predetermined amount of time and/or until the components are well blended together and achieve consistency suitable for a hydroseeding application. Alternatively, at least some of the components such as the surfactant/defoamer, tackifier, fertilizers, may be included in the process as additional components such that they are already present in the bale, which may be transported to the hydroseeder. When a predetermined viscosity and/or consistency is achieved, the method may include applying the composition by a hydro-spraying machine and spraying the same onto an application site. Upon contact with the site, the composition bonds directly to the soil, providing coverage to prevent soil loss and creating a sheltered environment for seed germination, plant establishment, and plant growth.

The method of applying the composition as a slow-release fertilizer is disclosed. The method may include hydrospraying the composition/mixture as described above over an area including or being free of plants. The method may include applying the composition by hand or mechanically over or in soil, over or in a hydroponic substrate, around plants, or a combination thereof. The soil or soil-free hydroponic material may be included in a field, landscaping area, garden, greenhouse, pot, etc.

The composition may be used as a mulch composition, a hydroseeding mixture for erosion control and/or revegetation, as an addition to a conventional mulch composition, growing mix, or substrate to replace at least partially one or more components. In at least one embodiment, the mulch composition or growing medium may displace peat, composted pine bark, perlite, vermiculite, sand, rock wool, compost, animal manure, rice hulls, hardwood bark, softwood bark, coir, wood fiber, other organic materials such as composted organic matter, the like, or a combination thereof.

As a hydroseeding mixture, the composition may be an effective solution for seed establishment, restoration of vegetation, natural fertilization, erosion control, or a combination thereof. The hydraulically-applied composition may bond directly to soil while protecting seed, thus sheltering seedlings and/or plants from wind, heavy rain, and other environmental conditions while allowing seed germination and plant growth. The composition may be used to secure statically-compromised slopes, stabilize highly erodible soil, reintroduce native species of plants, the like, or a combination thereof. The composition may be used alone or in combination with other erosion-control methods. The hydraulically-applied composition may be used during highway projects, recreational projects such as golf courses, in mine reclamation areas, in industrial or other applications.

Figure 9:
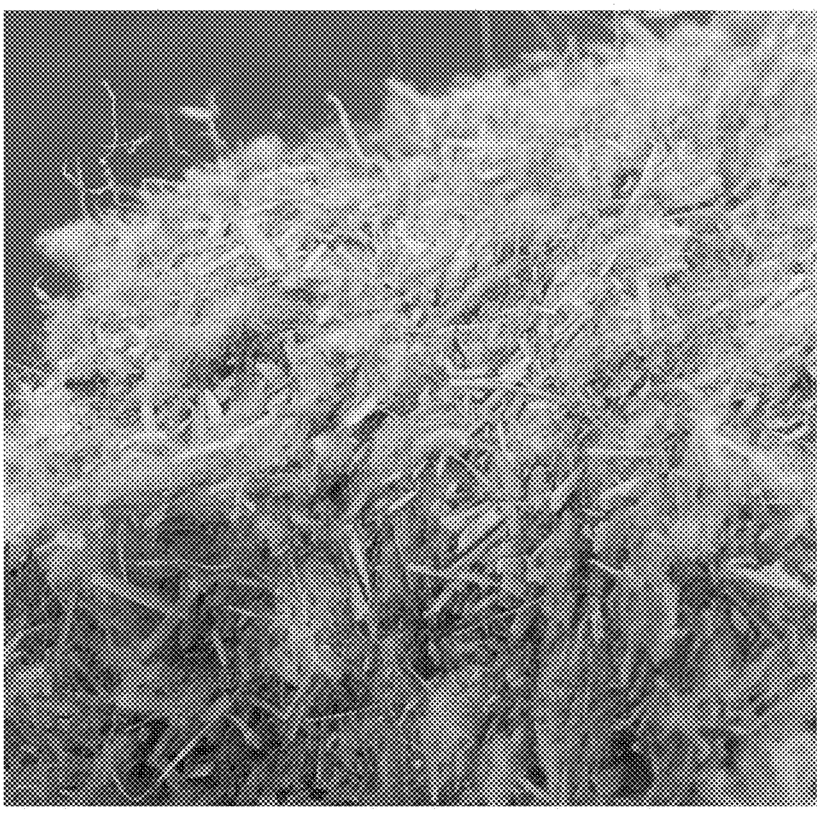
FIG. 9 is a photograph showing a finished composition according to one or more embodiments disclosed herein in a dry state.
Figure 10:
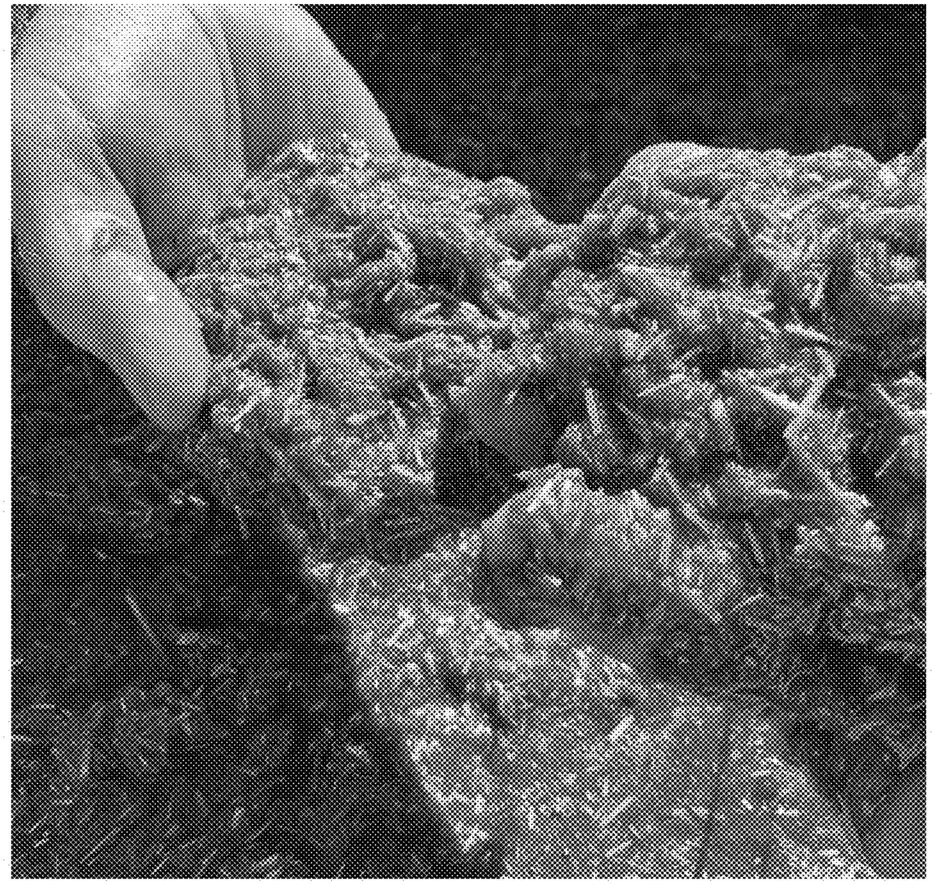
FIG. 10 is a photograph showing the composition of FIG. 9 in a hydrated state.

Non-limiting example of the final composition in a dry state is shown in FIG. 9 and in a hydrated state in FIG. 10. The example included 76 wt. % alfalfa straw, 20 wt. % refined pulp fiber, and 4 wt. % tackifier.

Figure 11:
FIG. 11 PRIOR ART
FIG. 11 is a photograph showing a prior art composition in a dry state.
Figure 12:
FIG. 12 PRIOR ART
FIG. 12 is a photograph showing the prior art composition of FIG. 11 in a hydrated state.

A prior art comparative example of a mulch in a dry state is shown in FIG. 11 and in a hydrated state in FIG. 12. The comparative example mulch of FIGS. 11 and 12 is free of alfalfa straw and was hydrated with an equivalent amount of moisture as the non-limiting example of FIGS. 9 and 10. The comparative example included 76 wt. % wheat straw, 20 wt. % refined pulp fiber, and 4 wt. % tackifier.

As can be observed in the FIGS. 9-12, the alfalfa straw-based composition has better water absorption than the composition free of alfalfa. Comparing FIGS. 9-12 also shows that the alfalfa straw-based composition has more lofty, airy character while the composition free of alfalfa appears denser.

pH of the composition disclosed herein may be about 6.5-7.5. pH may be about, at least about, or at most about 6.5, 6.6, 6.7, 6.8, 6.9, 7.0, 7.1, 7.2, 7.3, 7.4, or 7.5.

Examples of suitable fibrous straws, mechanical integrity additive(s), growing mulch compositions, as well as their manner of making or providing, and can be found in U.S. Pat. Nos. 8,490,326 and 7,891,933, which are incorporated herein by reference in their entirety. Examples of suitable fibrous wood and growing mulch compositions, as well as their manner of making or providing, and can be found in U.S. Pat. Nos. 10,266,457, 10,519,073, 10,519,373 and 10,907,098, which are incorporated herein by reference in their entirety.

EXPERIMENTAL SECTION

Examples 6-12

Examples 6-12 were prepared according to the method described above. Examples 6-12 included a single type of straw fiber—alfalfa straw. The straw was hammermilled to the size referenced above, prepared as input material for a composition described herein. Examples 6-12 thus included 100 wt. % alfalfa straw, based on the total weight of the straw fiber in the composition. Examples 6-12 further included refined pulp fiber and tackifier in quantities indicated in Table 2 below. Particle distribution (including average values), assessed by the ROTAP testing procedure described above, is provided for each example in Table 2 below.

TABLE 2

| Particle distribution of Examples 6-12 including alfalfa straw | | | | | | | | | |
|---|---|---|---|---|---|---|---|---|---|
| | | Example no. | | | | | | | |
| | | 6 | 7 | 8 | 9 | 10 | 11 | 12 | Average |
| Composition breakdown | | Straw fiber total 76 wt. %, Refined pulp 20 wt. %, Tackifier 4 wt. % | | | | | | | |
| Type of Straw Fiber | | 100 wt. % alfalfa | | | | | | | |
| Sieves [Mesh/μm] | Particle Range [mm] | Example Particle Distribution [%] | | | | | | | |
| #8/2360 | 2.36-4.74 | 14.79 | 15.61 | 20.70 | 14.89 | 16.58 | 12.20 | 17.80 | 16.08 |
| #16/1180 | 1.18-2.35 | 29.68 | 31.22 | 27.35 | 30.64 | 30.36 | 31.86 | 30.76 | 30.27 |
| #25/710 | 0.71-1.17 | 19.54 | 18.94 | 18.27 | 22.33 | 20.62 | 21.14 | 20.27 | 20.16 |
| #50/300 | 0.3-0.7 | 18.82 | 19.04 | 17.95 | 20.06 | 18.34 | 20.08 | 17.28 | 18.80 |
| #100/150 | 0.15-0.29 | 8.27 | 6.56 | 7.60 | 7.01 | 6.63 | 7.36 | 6.38 | 7.12 |
| Pan/<150 | <0.15 | 8.89 | 8.64 | 8.13 | 5.07 | 7.46 | 7.36 | 7.51 | 7.58 |

pH of Examples 6-12 was also measured. Average initial pH for Examples 6-12 was measured at 5.4, and in 30 minutes after the test was initiated at 6.7.

Comparative Examples C2-C5

Comparative Examples C2-C5 were prepared according to the method described above. Comparative Examples C2-C5 included a single type of straw fiber—wheat straw. Comparative Examples C2-C5 thus included 100 wt. % wheat straw, based on the total weight of the straw fiber in the composition. The straw was hammermilled to the size referenced above. Comparative Examples C2-C5 further included refined pulp fiber and tackifier in quantities indicated in Table 3 below. Particle distribution (including average values), assessed by the ROTAP testing procedure described above, is provided for each example in Table 3 below.

TABLE 3

| Particle distribution of Comparative Examples C2-C5 including wheat straw | | | | | | |
|---|---|---|---|---|---|---|
| | | Example no. | | | | |
| | | C2 | C3 | C4 | C5 | Average |
| Composition breakdown | | Straw fiber total 76 wt. %, Refined pulp 20 wt. %, Tackifier 4 wt. % | | | | |
| Type of Straw Fiber | | 100 wt. % wheat | | | | |
| Sieves [Mesh/μm] | Particle Range [mm] | Example Particle Distribution [%] | | | | |
| #8/2360 | 2.36-4.74 | 21.17 | 32.45 | 36.50 | 34.43 | 31.14 |
| #16/1180 | 1.18-2.35 | 30.96 | 35.01 | 33.54 | 34.54 | 33.51 |
| #25/710 | 0.71-1.17 | 16.60 | 15.15 | 14.01 | 14.33 | 15.02 |
| #50/300 | 0.3-0.7 | 18.62 | 12.69 | 11.86 | 12.16 | 13.83 |
| #100/150 | 0.15-0.29 | 7.34 | 3.38 | 2.97 | 3.20 | 4.22 |
| Pan/<150 | <0.15 | 5.32 | 1.33 | 1.12 | 1.32 | 2.28 |

pH of Comparative Examples C2-C5 was also measured. Average initial pH for Comparative Examples C2-C5 was measured at 4.57, and in 30 minutes after the test was initiated at 5.27.

Examples 13-18

Examples 13-18 were prepared according to the method described above. Examples 13-18 included alfalfa straw fiber and wheat straw in equal amounts. Examples 13-18 thus included 50 wt. % alfalfa straw and 50 wt. % wheat straw, based on the total weight of the straw fiber in the composition. The straw was hammermilled to the size referenced above, prepared as input material for a composition described herein. Examples 13-18 further included refined pulp fiber and tackifier in quantities indicated in Table 4 below. Particle distribution (including average values), assessed by the ROTAP testing procedure described above, is provided for each example in Table 4 below.

TABLE 4

Particle distribution of Examples 13-18 including alfalfa straw and wheat straw

| | | Example no. | | | | | | |
|---|---|---|---|---|---|---|---|---|
| | | 13 | 14 | 15 | 16 | 17 | 18 | Average |
| Composition breakdown Type of Straw Fiber | | Straw fiber total 76 wt. %, Refined pulp 20 wt. %, Tackifier 4 wt. % 50 wt. % alfalfa, 50 wt. % wheat | | | | | | |
| Sieves [Mesh/ μm] | Particle Range [mm] | Example Particle Distribution [%] | | | | | | |
| #8/ 2360 | 2.36-4.74 | 17.82 | 23.16 | 14.78 | 12.53 | 11.44 | 8.95 | 14.78 |
| #16/ 1180 | 1.18-2.35 | 33.66 | 36.84 | 30.38 | 31.52 | 30.41 | 31.74 | 32.43 |
| #25/ 710 | 0.71-1.17 | 17.82 | 14.74 | 20.18 | 20.84 | 21.03 | 24.31 | 19.82 |
| #50/ 300 | 0.3-0.7 | 16.83 | 13.68 | 22.02 | 22.38 | 23.81 | 21.57 | 20.05 |
| #100/ 150 | 0.15-0.29 | 6.93 | 5.26 | 6.93 | 7.19 | 7.53 | 7.22 | 6.84 |
| Pan/ <150 | <0.15 | 6.93 | 6.32 | 5.71 | 5.54 | 5.77 | 6.21 | 6.08 |

pH of Examples 13-18 was also measured. Average initial pH for Examples 13-18 was measured at 5.6, and in 30 minutes after the test was initiated at 6.0.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A composition comprising:

a plurality of processed leguminous straw particles having about 18-21 wt. % of particles having a sieve size #25 or particles measuring 0.71-1.17 mm and about 18-20 wt. % of particles having a sieve size #50 or particles measuring 0.3-0.7 mm, based on total weight of the leguminous straw particles, wherein the leguminous straw particles include a mixture of leguminous straw species, the composition being a mulch composition.

2. The composition of claim 1 further comprising one or more mechanical integrity additives.

3. The composition of claim 2, wherein the one or more mechanical integrity additives include at least one of refined pulp fiber, cellulose pulp fiber, sodium polyacrylate, carboxy methyl cellulose, paper particles, fluff pulp fibers, reclaimed SAM fluff pulp mix fibers, cellulose pulp fibers, recycled paper, recycled newsprint, cellulose fibers.

4. The composition of claim 1, wherein the leguminous straw particles include milled alfalfa straw particles.

5. The composition of claim 1 further comprising at least one of a tackifier, dye, biostimulant, fertilizer, water, wood and/or bark fiber, secondary straw particles.

6. The composition of claim 5, wherein the secondary straw particles are present and are wheat straw particles.

7. The composition of claim 5, wherein a vol. % ratio of the leguminous straw particles to the secondary straw particles is about 40:60-60:40.

8. The composition of claim 1, wherein the leguminous straw particles include organically bound NPK.

9. A composition comprising:

a blend of natural straw particles including about 5-95 wt. % alfalfa straw particles and about 5-95 wt. % secondary straw particles, the alfalfa straw particles forming about 5-95 wt. % of the composition;

refined fibers of wood, refined fibers of bark, or refined fiber of wood and bark;

mechanical integrity additives; and the composition being a slow-release fertilizer composition.

10. The composition of claim 9, wherein the one or more mechanical integrity additives include at least one of refined pulp fiber, cellulose pulp fiber, sodium polyacrylate, carboxy methyl cellulose, paper particles, fluff pulp fibers, reclaimed SAM fluff pulp mix fibers, cellulose pulp fibers, recycled paper, recycled newsprint, cellulose fibers.

11. The composition of claim 9, wherein the secondary straw particles include wheat straw particles.

12. The composition of claim 9, wherein the alfalfa straw particles are hammermilled alfalfa straw particles.

13. The composition of claim 9, wherein a vol. % ratio of the alfalfa straw particles to the secondary straw particles is about 40:60-60:40.

14. The composition of claim 9, wherein a particle distribution of the alfalfa straw particles includes about 17-20 wt. % of particles having a sieve size #25 or particles measuring 0.71-1.17 mm and about 18-20 wt. % of particles having a sieve size #50 or particles measuring 0.3-0.7 mm, based on total weight of the alfalfa straw particles.

15. The composition of claim 9 further comprising a cotton byproduct.

16. A mulch composition comprising:

a plurality of milled alfalfa stalk particles having a particle distribution of about 17-20 wt. % of particles having a sieve size #25, equivalent to 0.71-1.17 mm, and about 18-20 wt. % of particles having a sieve size #50, equivalent to 0.3-0.7 mm, based on the wt. % of the milled alfalfa stalk particles; and a plurality of secondary straw particles, the composition having a pH of about 5.5-7.5.

17. The mulch composition of claim 16 further comprising a tackifier, dye, biostimulant, fertilizer, water, wood and/or bark fiber, or a combination thereof.

18. The mulch composition of claim 16, wherein the mulch composition is a slow-release fertilizer composition.

19. The composition of claim 16 further comprising a cotton byproduct.

20. The mulch composition of claim 16, wherein the secondary straw particles are wheat straw particles.

21. The mulch composition of claim 16, wherein a vol. % ratio of the milled alfalfa stalk particles to the secondary straw particles is about 40:60-60:40.

* * * * *